(12) United States Patent
    Ji

(10) Patent No.: US 11,182,290 B2
(45) Date of Patent: Nov. 23, 2021

(54) DATA STORAGE DEVICE AND OPERATING METHOD THEREOF FOR PERFORMING A GARBAGE COLLECTION OPERATION IN CONSIDERATION OF A LIFETIME OF A NONVOLATILE MEMORY DEVICE

(71) Applicant: SK hynix Inc., Gyeonggi-do (KR)

(72) Inventor: Seung Gu Ji, Seoul (KR)

(73) Assignee: SK hynix Inc., Gyeonggi-do (KR)

(*) Notice: Subject to any disclaimer, the term of this patent is extended or adjusted under 35 U.S.C. 154(b) by 0 days.

(21) Appl. No.: 15/785,517

(22) Filed: Oct. 17, 2017

(65) Prior Publication Data
    US 2018/0225199 A1    Aug. 9, 2018

(30) Foreign Application Priority Data
    Feb. 9, 2017  (KR) .................. 10-2017-0018084

(51) Int. Cl.
    *G06F 12/02*    (2006.01)
(52) U.S. Cl.
    CPC ...... *G06F 12/0253* (2013.01); *G06F 12/0238* (2013.01); *G06F 12/0246* (2013.01); *G06F 2212/1016* (2013.01); *G06F 2212/7204* (2013.01); *G06F 2212/7205* (2013.01)
(58) Field of Classification Search
    None
    See application file for complete search history.

(56) References Cited

U.S. PATENT DOCUMENTS

| 9,842,060 | B1* | 12/2017 | Jannyavula Venkata ................... G06F 12/128 |
| 2015/0347025 | A1* | 12/2015 | Law ..................... G06F 3/0611 711/103 |
| 2016/0092120 | A1* | 3/2016 | Liu ........................ G06F 3/0629 711/103 |
| 2016/0147454 | A1 | 5/2016 | Meir et al. |
| 2016/0313922 | A1* | 10/2016 | Kojima ................. G06F 3/0605 |
| 2017/0262177 | A1* | 9/2017 | Hashimoto ........... G06F 3/0604 |
| 2018/0059977 | A1* | 3/2018 | Matsuyama .......... G06F 3/0625 |
| 2018/0276123 | A1* | 9/2018 | Matsudaira ......... G06F 12/0276 |
| 2020/0210219 | A1* | 7/2020 | Kim ...................... G06F 9/5022 |

FOREIGN PATENT DOCUMENTS

| KR | 1020140020442 | 2/2014 |
| KR | 1020140113212 | 9/2014 |

OTHER PUBLICATIONS

Zheng W et al., Flash Storage Technology, Journal of Computer Research and Development, Apr. 2010, pp. 716-726.
Office Action issued by the State Intellectual Property Office (SIPO) of China dated Apr. 25, 2021.

* cited by examiner

*Primary Examiner* — Charles Rones
*Assistant Examiner* — Ryan Dare
(74) *Attorney, Agent, or Firm* — IP & T Group LLP

(57) ABSTRACT

A data storage device includes a nonvolatile memory device; and a controller suitable for setting a termination condition of a garbage collection operation based on an over-provisioning ratio of the nonvolatile memory device, performing the garbage collection operation, and terminating the garbage collection operation according to the termination condition.

10 Claims, 5 Drawing Sheets

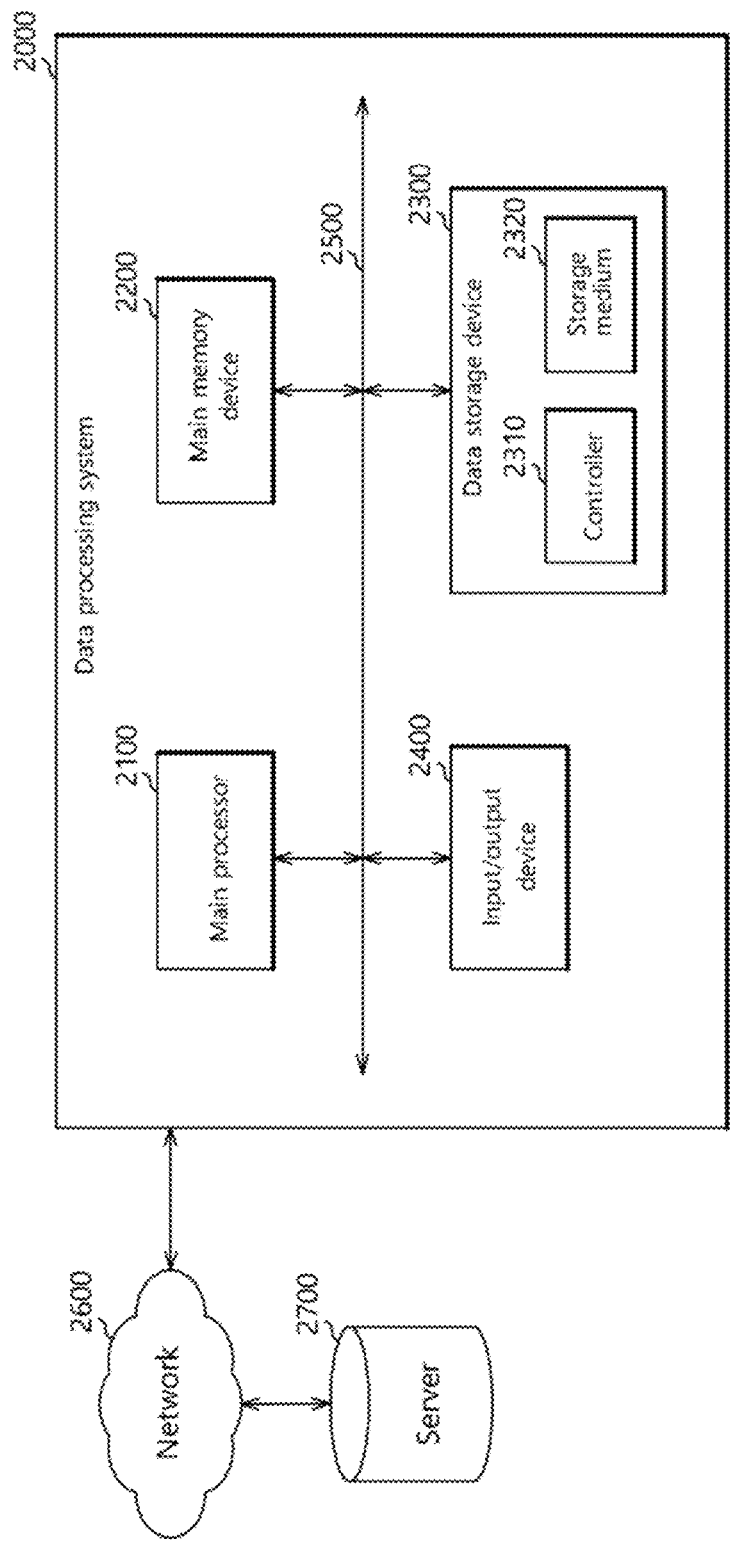

DATA STORAGE DEVICE AND OPERATING METHOD THEREOF FOR PERFORMING A GARBAGE COLLECTION OPERATION IN CONSIDERATION OF A LIFETIME OF A NONVOLATILE MEMORY DEVICE

CROSS-REFERENCES TO RELATED APPLICATION

The present application claims priority under 35 U.S.C. § 119(a) to Korean application number 10-2017-0018084, filed on Feb. 9, 2017, in the Korean Intellectual Property Office, which is incorporated herein by reference in its entirety.

BACKGROUND

1. Technical Field

Various embodiments generally relate to a data storage device, and, more particularly, to a data storage device including a nonvolatile memory device.

2. Related Art

Data storage devices store data provided by an external device in response to a write request. Data storage devices may also provide stored data to an external device in response to a read request. Examples of external devices that use data storage devices include computers, digital cameras, cellular phones and the like. Data storage devices may be embedded in an external device during manufacturing of the external devices or may be fabricated separately and then connected afterwards to an external device.

SUMMARY

In an embodiment, a data storage device may include: a nonvolatile memory device; and a controller suitable for setting a termination condition of a garbage collection operation based on an over-provisioning ratio of the nonvolatile memory device, performing the garbage collection operation, and terminating the garbage collection operation according to the termination condition.

In an embodiment, a data storage device may include: a nonvolatile memory device; and a controller suitable for generating free memory blocks of the nonvolatile memory device depending on an over-provisioning ratio of the nonvolatile memory device.

In an embodiment, a method for operating a data storage device may include: setting a termination condition of a garbage collection operation, based on an over-provisioning ratio of a nonvolatile memory device; performing the garbage collection operation; and terminating the garbage collection operation according to the termination condition.

BRIEF DESCRIPTION OF THE DRAWINGS

The above and other features and advantages of the present invention will become more apparent to those skilled in the art to which the present invention belongs by describing various embodiments thereof with reference to the attached drawings in which:

FIG. 7 is a block diagram illustrating a data processing system to which the data storage device in accordance with the embodiment is applied.

DETAILED DESCRIPTION

Figure 1:
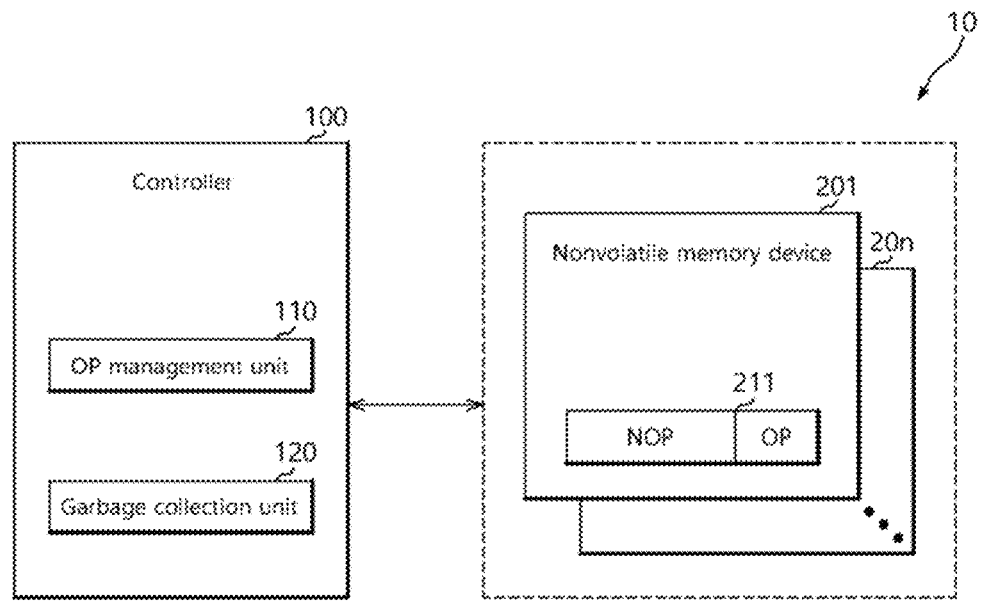
FIG. 1 is a block diagram illustrating a data storage device in accordance with an embodiment.

Hereinafter, a data storage device and an operating method thereof according to the present invention will be described with reference to the accompanying drawings through exemplary embodiments of the present invention. The present invention may, however, be embodied in different forms and should not be construed as being limited to the embodiments set forth herein. Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, B, and C.

The term "or" as used herein means either one of two or more alternatives but neither both nor any combinations thereof.

As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" Includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element also referred to as a feature described in connection with one embodiment may be used singly or in combination with other elements of another embodiment, unless specifically indicated otherwise.

Hereinafter, the various embodiments of the present invention will be described in detail with reference to the attached drawings.

FIG. 1 is a block diagram illustrating a data storage device 10 in accordance with an embodiment.

The data storage device 10 may store data provided from an external device in response to a write request from the external device. Also, the data storage device 10 may provide stored data to the external device in response to a read request from the external device.

The data storage device 10 may be prepared in the form of a Personal Computer Memory Card International Association (PCMCIA) card, a Compact Flash (CF) card, a smart media card, a memory stick, various multimedia cards (for example, MMC, eMMC, RS-MMC, and MMC-Micro), various secure digital cards (for example, SD, Mini-SD, and Micro-SD), a Universal Flash Storage (UFS), a Solid State Drive (SSD) and the like.

The data storage device 10 may include a controller 100 and nonvolatile memory devices 201 to 20$n$.

The controller 100 may control general operations of the data storage device 10. The controller 100 may store data in the nonvolatile memory devices 201 to 20$n$ in response to a write request transmitted from the external device, and may read data stored in the nonvolatile memory devices 201 to 20$n$ and output read data to the external device in response to a read request transmitted from the external device.

The controller 100 may include an over-provisioning management unit 110 and a garbage collection unit 120.

The over-provisioning management unit 110 may manage over-provisioning regions of the respective nonvolatile memory devices 201 to 20$n$. For instance, for the nonvolatile memory device 201, the over-provisioning management unit 110 may manage an over-provisioning ratio representing a ratio of an over-provisioning region OP with respect to an entire memory region 211. For example, the over-provisioning management unit 110 may adjust the over-provisioning ratio according to a request from the external device. For example, the over-provisioning management unit 110 may adjust the over-provisioning ratio by replacing a bad region in a non-over-provisioning region NOP with the over-provisioning region OP.

The garbage collection unit 120 may perform a garbage collection operation based on an over-provisioning ratio. In detail, the garbage collection unit 120 may set a termination condition of a garbage collection operation based on an over-provisioning ratio, and terminate the garbage collection operation according to the termination condition. The termination condition may be associated with a number of free memory blocks of a nonvolatile memory device to which a garbage collection operation is to be performed. The garbage collection unit 120 may perform a garbage collection operation based on an over-provisioning ratio, to each of the nonvolatile memory devices 201 to 20$n$.

As will be described below, since an over-provisioning ratio is associated with the lifetime of a nonvolatile memory device, the garbage collection unit 120 may perform a garbage collection operation in consideration of the lifetime of a nonvolatile memory device. In other words, since an aggressive garbage collection shortens the lifetime of a nonvolatile memory device while extending available storage capacity by generating sufficient free memory blocks, the garbage collection unit 120 may perform a garbage collection operation moderately or aggressively in consideration of the lifetime of a nonvolatile memory device. Therefore, in the present embodiment, the operational performance of the data storage device 10 may be maximized while ensuring the lifetime of a nonvolatile memory device.

The nonvolatile memory devices 201 to 20$n$ may store data transmitted from the controller 100 and may read stored data and transmit read data to the controller 100, according to control of the controller 100.

When making descriptions by taking the nonvolatile memory device 201 as an example, the nonvolatile memory device 201 may include the memory region 211 in which data are written. Although not shown, the memory region 211 may include a plurality of memory blocks. The memory region 211 may be divided into the non-over-provisioning region NOP and the over-provisioning region OP.

The non-over-provisioning region NOP may be exposed to the external device. Namely, the external device may regard the capacity of the non-over-provisioning region NOP as the storage capacity of the nonvolatile memory device 201, and store data in the nonvolatile memory device 201.

The over-provisioning region OP may not be exposed to the external device and may be provided for a management operation of the data storage device 10. For example, the over-provisioning region OP may be used to replace a bad region of the non-over-provisioning region NOP, and be used for the garbage collection operation of the garbage collection unit 120. Therefore, the capacity of the over-provisioning region OP may be associated with the lifetime of the nonvolatile memory device 201. In general, as the capacity or ratio of the over-provisioning region OP is large, the lifetime of the nonvolatile memory device 201 may be ensured further.

A nonvolatile memory device may include a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

Figure 2:
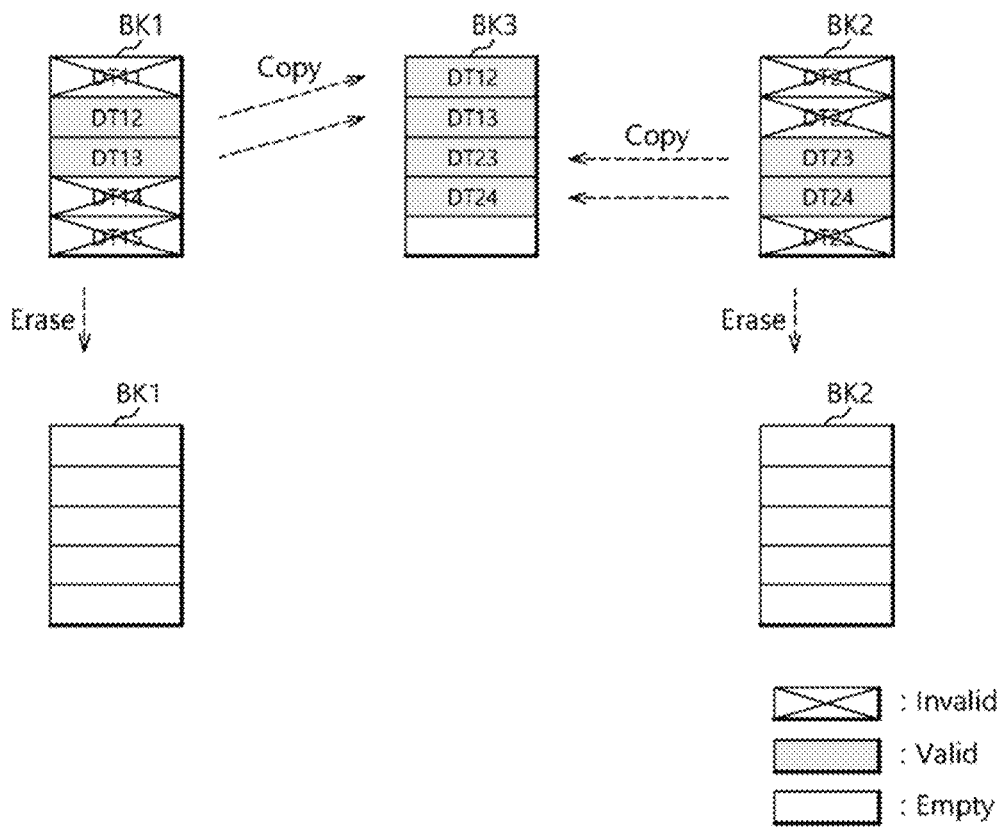
FIG. 2 is a diagram illustrating a garbage collection operation of a garbage collection unit of FIG. 1.

FIG. 2 is a diagram illustrating a garbage collection operation of the garbage collection unit 120.

Referring to FIG. 2, for example, in the nonvolatile memory device 201, a dirty memory block BK1 to which a garbage collection operation is to be performed may be storing valid data DT12 and DT13 and invalid data DT11, DT14 and DT15. A dirty memory block BK2 to which the garbage collection operation is to be performed may be storing valid data DT23 and DT24 and invalid data DT21, DT22 and DT25.

When performing the garbage collection operation to the memory blocks BK1 and BK2, the garbage collection unit 120 may copy the valid data DT12, DT13, DT23 and DT24 stored in the memory blocks BK1 and BK2, to another memory block BK3, and erase the memory blocks BK1 and BK2.

Therefore, while one free memory block BK3 exists among the memory blocks BK1 to BK3 before the garbage collection operation, two free memory blocks BK1 and BK2 may exist after the garbage collection operation. That is, the garbage collection operation may be performed to secure free memory blocks in the nonvolatile memory device 201 and thereby increase available data storage capacity.

A garbage collection operation may be performed when a predetermined start condition is satisfied. The start condition may be, for example, when a write request is provided from the external device or when a number of free memory blocks is less than a threshold number.

Nevertheless, since a garbage collection operation includes a copy operation and an erase operation as described above, frequent performing of a garbage collection operation may accelerate wear of a memory and shorten the lifetime of a nonvolatile memory device. Thus, it is necessary to perform a garbage collection operation in consideration of the lifetime of a nonvolatile memory device.

Figure 3:
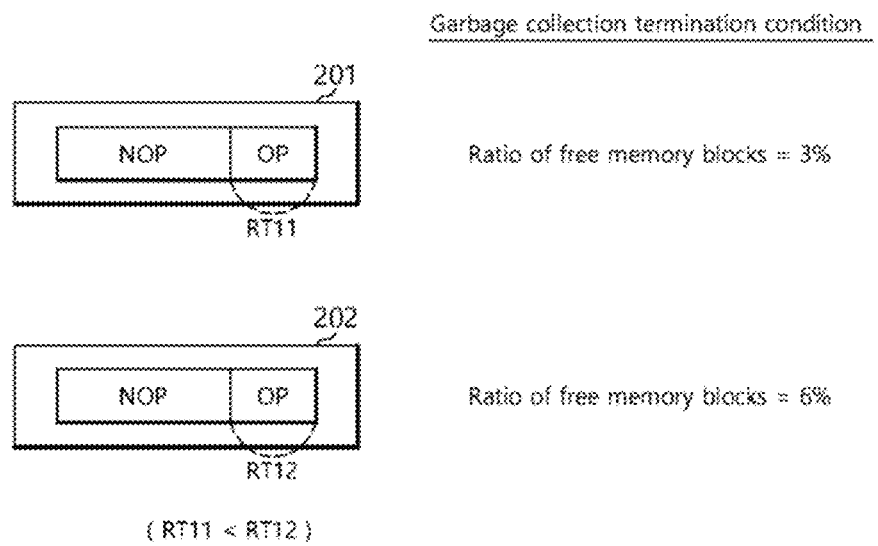
FIG. 3 is a diagram illustrating a method for setting a termination condition of a garbage collection operation based on an over-provisioning ratio.

FIG. 3 is a diagram illustrating a method for setting the termination condition of a garbage collection operation based on the over-provisioning ratio.

Referring to FIG. 3, over-provisioning ratios RT11 and RT12 of different nonvolatile memory devices 201 and 202 may be different from each other. For example, the over-provisioning ratio RT11 of the nonvolatile memory device 201 may be less than the over-provisioning ratio RT12 of the nonvolatile memory device 202.

In this case, the garbage collection unit 120 may set 3% of a ratio of free memory blocks in the nonvolatile memory device 201 as a termination condition of a garbage collection operation to be performed to the nonvolatile memory device 201, and set 6% of a ratio of free memory blocks in the nonvolatile memory device 202 as a termination condition of a garbage collection operation to be performed to the nonvolatile memory device 202. That is, the garbage collection unit 120 may set a higher ratio of free memory blocks in a nonvolatile memory block having a greater over-provisioning ratio as the termination condition of a garbage collection operation to be performed to the nonvolatile memory device.

The nonvolatile memory device 201 may have a shorter lifetime than the nonvolatile memory device 202 according to the over-provisioning ratio RT11 which is less than the over-provisioning ratio RT12. Therefore, a garbage collection operation for the nonvolatile memory device 201 of the lesser over-provisioning ratio RT11 needs to be performed moderately, and thus the garbage collection operation needs to be terminated even when a relatively small number of free memory blocks are generated. Conversely, the nonvolatile memory device 202 may have a longer lifetime than the nonvolatile memory device 201 according to the over-provisioning ratio RT12 which is greater than the over-provisioning ratio RT11. Therefore, a garbage collection operation for the nonvolatile memory device 202 of the greater over-provisioning ratio RT12 needs to be performed aggressively, and thus the garbage collection operation needs to be terminated when a relatively large number of free memory blocks are generated.

Figure 4:
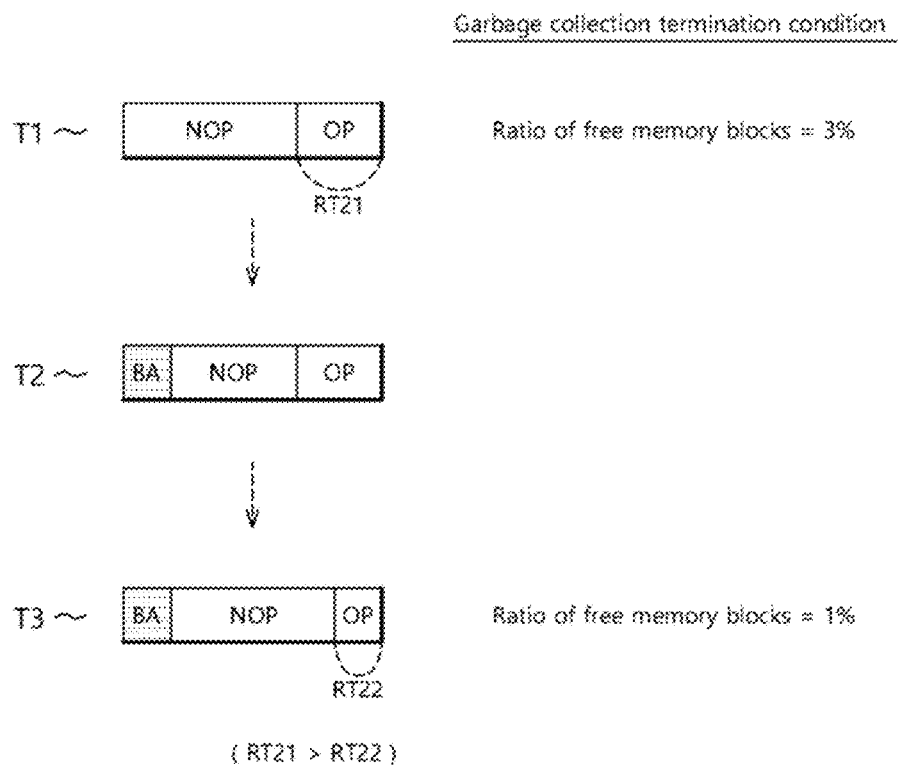
FIG. 4 is a diagram illustrating a method for resetting a termination condition of a garbage collection operation according to a variation of an over-provisioning ratio.

FIG. 4 is a diagram illustrating a method for resetting the termination condition of a garbage collection operation according to a variation of the over-provisioning ratio.

Referring to FIG. 4, for instance, in the nonvolatile memory device 201, the over-positioning ratio may be varied. For example, as a bad region BA in the non-over-provisioning region NOP is replaced with the over-provisioning region OP, the over-positioning ratio may be reduced. In this case, the garbage collection unit 120 may reset the termination condition of a garbage collection operation according to the variation of the over-provisioning ratio.

At a time T1, depending on the over-provisioning ratio RT21, the garbage collection unit 120 may set 3% of a ratio of free memory blocks as a termination condition of a garbage collection operation.

At a time T2, a bad region BA may occur in the non-over-provisioning region NOP. Accordingly, available storage capacity may decrease.

At a time T3, the over-provisioning management unit 110 may supplement available storage capacity by converting a portion of the over-provisioning region OP into the non-over-provisioning region NOP. As the over-provisioning ratio RT21 changes to an over-provisioning ratio RT22 due to the conversion of the over-provisioning region OP into the non-over-provisioning region NOP, the garbage collection unit 120 may adjust the termination condition of a garbage collection operation to 1% of a ratio of free memory blocks. That is, as the over-provisioning ratio decreases, the garbage collection unit 120 may set a smaller ratio of free memory blocks in a nonvolatile memory block having the decreased over-provisioning ratio as the termination condition of a garbage collection operation to be performed to the nonvolatile memory device.

When a ratio of free memory blocks is set as the termination condition of a garbage collection operation in the embodiment shown in FIGS. 3 and 4, it is to be noted that, according to an embodiment, a number of free memory blocks may be set as the termination condition of a garbage collection operation.

Figure 5:
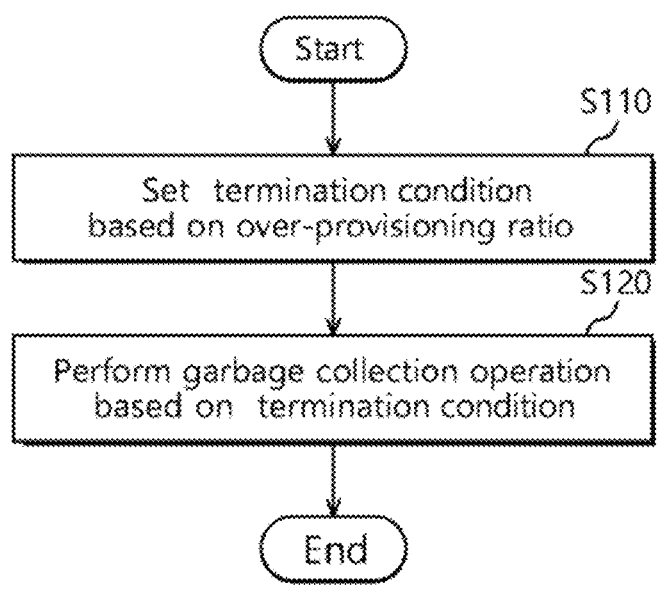
FIG. 5 is a flow chart illustrating a method for operating the data storage device of FIG. 1.

FIG. 5 is a flow chart illustrating a method for operating the data storage device 10.

At step S110, the garbage collection unit 120 may set the termination condition of a garbage collection operation based on the over-provisioning ratio of each of the nonvolatile memory devices 201 to 20n. In detail, the garbage collection unit 120 may set higher ratio of free memory blocks in a nonvolatile memory block having a greater over-provisioning ratio as the termination condition of a garbage collection operation to be performed to the nonvolatile memory device. The garbage collection unit 120 may adjust the termination condition according to a variation of an over-provisioning ratio.

At step S120, the garbage collection unit 120 may perform a garbage collection operation for each of the nonvolatile memory devices 201 to 20n, and terminate the garbage collection operation according to the termination condition of step S110. The garbage collection unit 120 may perform the garbage collection operation until a ratio of free memory blocks set as the termination condition is satisfied.

Figure 6:
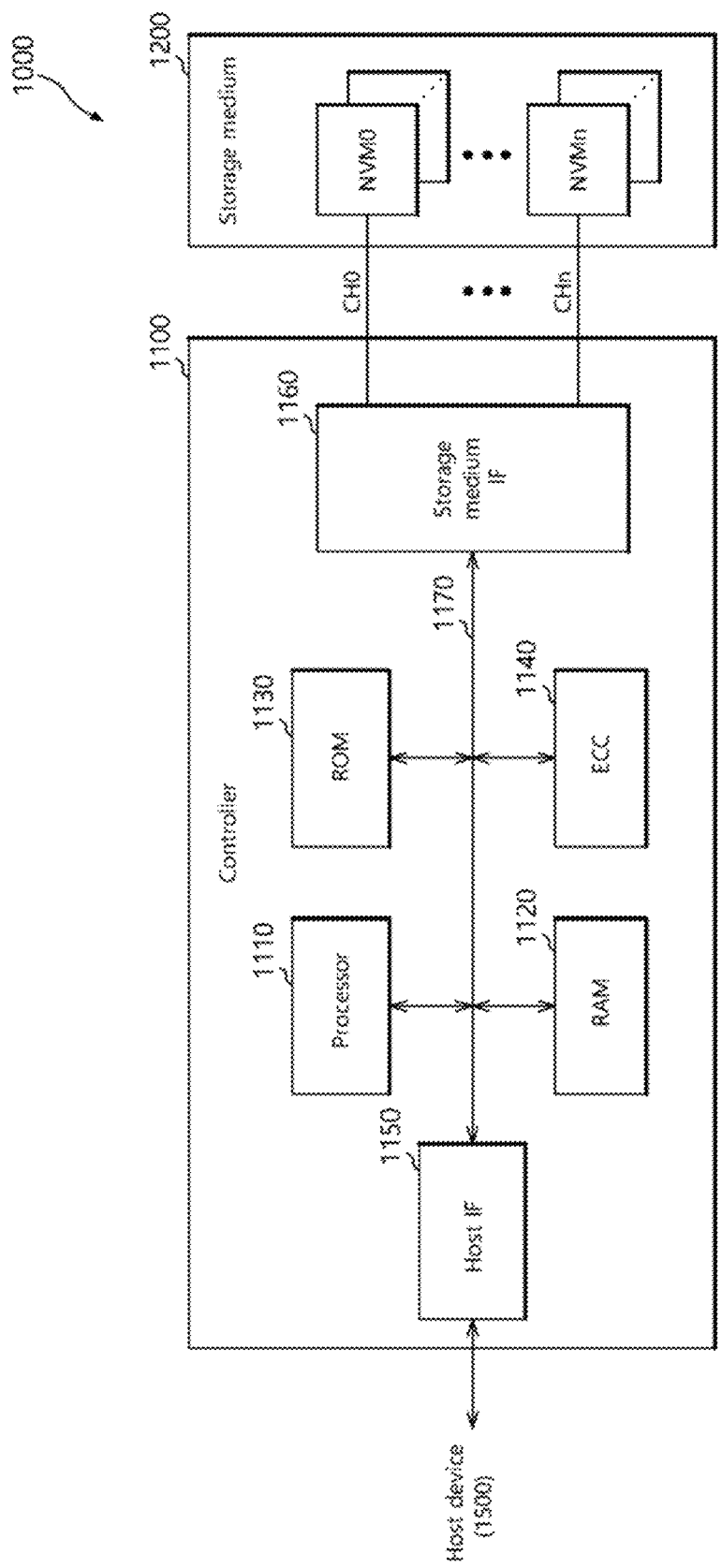
FIG. 6 is a block diagram illustrating a Solid State Drive (SSD) in accordance with an embodiment.

FIG. 6 is a block diagram illustrating a Solid State Drive (SSD) 1000 in accordance with an embodiment.

The SSD 1000 may include a controller 1100 and a storage medium 1200.

The controller 1100 may control data exchange between a host device 1500 and the storage medium 1200. The controller 1100 may include a processor 1110, a RAM 1120, a ROM 1130, an ECC unit 1140, a host interface 1150, and a storage medium interface 1160, operatively coupled via an internal bus 1170.

The processor 1110 may control general operations of the controller 1100. The processor 1110 may store data in the storage medium 1200 and read stored data from the storage medium 1200, according to data processing requests from the host device 1500. In order to efficiently manage the storage medium 1200, the processor 1110 may control internal operations of the SSD 1000 such as a merge operation, a wear leveling operation, and so forth.

The processor 1110 may perform, in substantially the same manner, the operations of the over-provisioning management unit 110 and the garbage collection unit 120 shown in FIG. 1. That is, the processor 1110 may manage the over-provisioning ratios of respective nonvolatile memory devices NVM0 to NVMn. Also, the processor 1110 may set a termination condition of a garbage collection operation for each of the nonvolatile memory devices NVM0 to NVMn based on an over-provisioning ratio, and perform the garbage collection operation based on the termination condition. The processor 1110 may set a termination condition such that, as an over-provisioning ratio is high, a garbage collection operation is terminated after generating a large number of free memory blocks.

The RAM 1120 may store programs and program data which are used by the processor 1110. The RAM 1120 may temporarily store data transmitted from the host interface 1150 before transferring the data to the storage medium 1200, and may temporarily store data transmitted from the storage medium 1200 before transferring the data to the host device 1500.

The ROM 1130 may store program codes to be read by the processor 1110. The program codes may include commands to be processed by the processor 1110 for the processor 1110 to control the internal units of the controller 1100.

The ECC unit 1140 may encode data to be stored in the storage medium 1200, and may decode data read from the storage medium 1200. The ECC unit 1140 may detect and correct an error occurred in data, according to an ECC algorithm.

The host interface 1150 may exchange data processing requests, data, etc. with the host device 1500.

The storage medium interface 1160 may transmit control signals and data to the storage medium 1200. The storage medium interface 1160 may be transmitted with data from the storage medium 1200. The storage medium interface 1160 may be coupled with the storage medium 1200 through a plurality of channels CH0 to CHn.

The storage medium 1200 may include a plurality of nonvolatile memory devices NVM0 to NVMn. Each of the plurality of nonvolatile memory devices NVM0 to NVMn may perform a write operation and a read operation according to the control of the controller 1100.

FIG. 7 is a block diagram illustrating a data processing system 2000 to which the data storage device 10 in accordance with the embodiment is applied.

The data processing system 2000 may include a computer, a laptop, a netbook, a smart phone, a digital TV, a digital camera, a navigator, etc. The data processing system 2000 may include a main processor 2100, a main memory device 2200, a data storage device 2300, and an input/output device 2400. The internal units of the data processing system 2000 may exchange data, control signals, etc. through a system bus 2500.

The main processor 2100 may control general operations of the data processing system 2000. The main processor 2100 may be, for example, a central processing unit such as a microprocessor. The main processor 2100 may execute the software of an operation system, an application, a device driver, and so forth, on the main memory device 2200.

The main memory device 2200 may store programs and program data to be used by the main processor 2100. The main memory device 2200 may temporarily store data to be transmitted to the data storage device 2300 and the input/output device 2400.

The data storage device 2300 may include a controller 2310 and a storage medium 2320. The data storage device 2300 may be configured and operate in a manner substantially similar to the data storage device 10 shown in FIG. 1.

The input/output device 2400 may include a keyboard, a scanner, a touch screen, a screen monitor, a printer, a mouse, or the like, capable of exchanging data with a user, such as receiving a command for controlling the data processing system 2000 from the user or providing a processed result to the user.

According to an embodiment, the data processing system 2000 may communicate with at least one server 2700 through a network 2600 such as a Local Area Network (LAN), a Wide Area Network (WAN), a wireless network, and so on. The data processing system 2000 may include a network interface (not shown) to access the network 2600.

While various embodiments have been described above, it will be understood by those skilled in the art that the embodiments described are examples only. Accordingly, the data storage device and the operating method thereof described herein should not be limited to the described embodiments. It will be apparent to those skilled in the art to which the present invention pertains that various other changes and modifications may be made without departing from the spirit and scope of the invention as defined in the following claims.

What is claimed is:

1. A data storage device comprising:
a nonvolatile memory device having a memory region which includes an over-provisioning region and a non-over-provisioning region;
an over-provisioning management unit configured to adjust, according to a request from an external device, an over-provisioning ratio of the nonvolatile memory device which is a ratio of the over-provisioning region to the memory region, by replacing a bad region in the non-over-provisioning region with a portion of the over-provisioning region thereby reducing the over-provisioning ratio; and
a garbage collection unit configured to sets a termination condition for a garbage collection operation that is performed on the non-over-provisioning region, so that the garbage collection operation is terminated when the termination condition is satisfied,
wherein the termination condition is based on a number of free memory blocks in the non-over-provisioning region on which the garbage collection operation is performed, and
wherein when the over-provisioning ratio is reduced, the garbage collection unit sets a lower number of free memory blocks in the non-over-provisioning region as the termination condition so that the garbage collection operation is terminated when the number of free memory blocks in the non-over-provisioning region resulting from the garbage collection operation exceeds the lower number of free memory blocks.

2. The data storage device according to claim 1, wherein the over-provisioning unit and the garbage collection unit are included in a controller of the data storage device.

3. The data storage device according to claim 1, wherein the garbage collection unit sets a higher number of free memory blocks as the termination condition when the over-provisioning ratio is increased.

4. The data storage device according to claim 1, wherein the garbage collection unit adjusts the termination condition according to a variation of the over-provisioning ratio.

5. The data storage device according to claim 2, wherein the controller generates the free memory blocks by copying valid data of a dirty memory block to another memory block, and erasing the dirty memory block.

6. A method for operating a data storage device including a nonvolatile memory device having a memory region which includes an over-provisioning region and a non-over-provisioning region, the method comprising:
    adjusting, by an over-provisioning management unit according to a request from an external device, an over-provisioning ratio of the nonvolatile memory device which is a ratio of the over-provisioning region to the memory region, by replacing a bad region in the non-over-provisioning region with a portion of the over-provisioning region thereby reducing the over-provisioning ratio;
    setting, by a garbage collection unit, a termination condition of a garbage collection operation that is performed on the non-over-provisioning region, the termination condition being based on a number of free memory blocks in the non-over-provisioning region on which the garbage collection operation is performed; and
    performing the garbage collection operation,
    wherein when the over-provisioning ratio is reduced, the garbage collection unit sets a lower number of free memory blocks in the non-over-provisioning region as the termination condition so that the garbage collection operation is terminated when the number of free memory blocks in the non-over-provisioning region resulting from the garbage collection operation exceeds the lower number of free memory blocks.

7. The method according to claim 6, wherein the over-provisioning management unit and the termination unit are included in a controller of the data storage device.

8. The method according to claim 6, wherein the setting of the termination condition includes setting a higher number of free memory blocks as the termination condition when the over-provisioning ratio is increased.

9. The method according to claim 6, further comprising adjusting the termination condition according to a variation of the over-provisioning ratio.

10. The method according to claim 6, wherein the free memory blocks are generated by copying valid data of a dirty memory block to another memory block, and erasing the dirty memory block.

* * * * *